(12) United States Patent
Wei et al.

(10) Patent No.: US 10,616,590 B1
(45) Date of Patent: Apr. 7, 2020

(54) OPTIMIZING STREAMING VIDEO ENCODING PROFILES

(71) Applicant: Amazon Technologies Inc., Seattle, WA (US)

(72) Inventors: Hai Wei, Seattle, WA (US); Amarsingh Buckthasingh Winston, Seattle, WA (US); Lei Li, Kirkland, WA (US); Yang Yang, Seattle, WA (US); Deepthi Nandakumar, Bangalore (IN); Avisar Ten-Ami, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/981,517

(22) Filed: May 16, 2018

(51) Int. Cl.
| | | |
|---|---|---|
| *H04N 19/00* | (2014.01) | |
| *H04N 19/196* | (2014.01) | |
| *H04N 19/124* | (2014.01) | |
| *H04N 19/184* | (2014.01) | |
| *H04N 19/147* | (2014.01) | |

(52) U.S. Cl.
CPC ......... *H04N 19/196* (2014.11); *H04N 19/124* (2014.11); *H04N 19/147* (2014.11); *H04N 19/184* (2014.11)

(58) Field of Classification Search
CPC .. H04N 19/196; H04N 19/124; H04N 19/147; H04N 19/184
See application file for complete search history.

(56) References Cited

U.S. PATENT DOCUMENTS

| | | | | |
|---|---|---|---|---|
| 2007/0233693 | A1* | 10/2007 | Baxter | H04L 29/06027 |
| 2015/0036740 | A1* | 2/2015 | Yang | H04N 19/105 |
| | | | | 375/240.02 |
| 2016/0295216 | A1* | 10/2016 | Aaron | H04N 19/124 |
| 2018/0063549 | A1* | 3/2018 | Amer | H04N 19/59 |
| 2018/0160161 | A1* | 6/2018 | Reznik | H04N 19/46 |
| 2018/0242002 | A1* | 8/2018 | Katsavounidis | H04N 19/177 |
| 2019/0028745 | A1* | 1/2019 | Katsavounidis | |
| | | | | H04N 21/234345 |

OTHER PUBLICATIONS

Aaron et al. "Per-Title Encode Optimization," Netflix Technology Blog, Dec. 14, 2015, https://medium.com/netflix-techblog/per-title-encode-optimization-7e99442b62a2, 13 pages.
Vanam et al., H.264/MPEG-4 AVC Encoder Parameter Selection Algorithms for Complexity Distortion Tradeoff, Proceedings of the Data Compression Conference, Mar. 2009, 11 Pages.
U.S. Appl. No. 16/588,652, filed Sep. 30, 2019, Wei et al.

* cited by examiner

*Primary Examiner* — Zhihan Zhou
(74) *Attorney, Agent, or Firm* — Weaver Austin Villeneuve & Sampson LLP (57) ABSTRACT

Techniques are described for optimizing streaming video encoding profiles.

20 Claims, 5 Drawing Sheets

OPTIMIZING STREAMING VIDEO ENCODING PROFILES

BACKGROUND

Streaming video services encode source content into various resolution and bit rate levels. These various resolution and bit rate levels allow the streaming video service to tailor video streams to a customer's playback device capability and bandwidth availability. On the client side, software running on the playback device adaptively switches between resolution and bit rate levels according to algorithms that manage the video quality and playback experience.

For a streaming video service with a large media content catalog having diverse content characteristics, determining the specific set of available resolution and bit rate levels for optimizing the customer experience remains a challenge. Furthermore, for a given resolution and bit rate level, automated and efficient determination of the values for encoding parameters is also a challenge. This challenge is increased in the context of codecs with numerous encoding parameters (e.g., 30-50), such as, for example, the Advanced Video Coding (AVC), High-Efficiency Video Coding (HEVC), and AOMedia Video 1 (AV1) codecs. Specifically, such codecs utilize encoding profiles having numerous encoding parameters, such as quantization parameters, block size parameters, adaptive encoding optimization parameters, and so forth, with each encoding parameter having either direct or indirect impact on encoding bit rate and quality. To address these challenges, streaming video services have conventionally relied on human subject matter experts to perform trial and error analysis on a limited dataset to determine a set of encoding profiles. While streaming video services have replaced certain manual processes by using computational modules for search/optimization processes, they have typically been limited to one or two encoding parameters, such as, for example, a quantization parameter or constant rate factor.

DETAILED DESCRIPTION

This disclosure describes techniques for tailoring a set of streaming video encoding profiles to the characteristics of a collection of video content. Optimization of the set of streaming video encoding profiles (referred to herein as an encoding ladder) to accommodate diverse playback conditions, such as, for example, by providing different tiers of bit rates and resolutions, includes adaptive sampling of video content, prioritization of encoding parameters, rate-quality data sampling of an encoding parameter combination space, data space pruning, and optimizing cost functions based on system constraints.

The techniques can be applied to an entire catalog of videos, a subset/group of video files, a single video title, or to video segments within a single video title. The techniques are codec-agnostic and can be applied to a scalable number of encoding parameters, rather than being limited to one or two encoding parameters. An example will be instructive.

Figure 1:
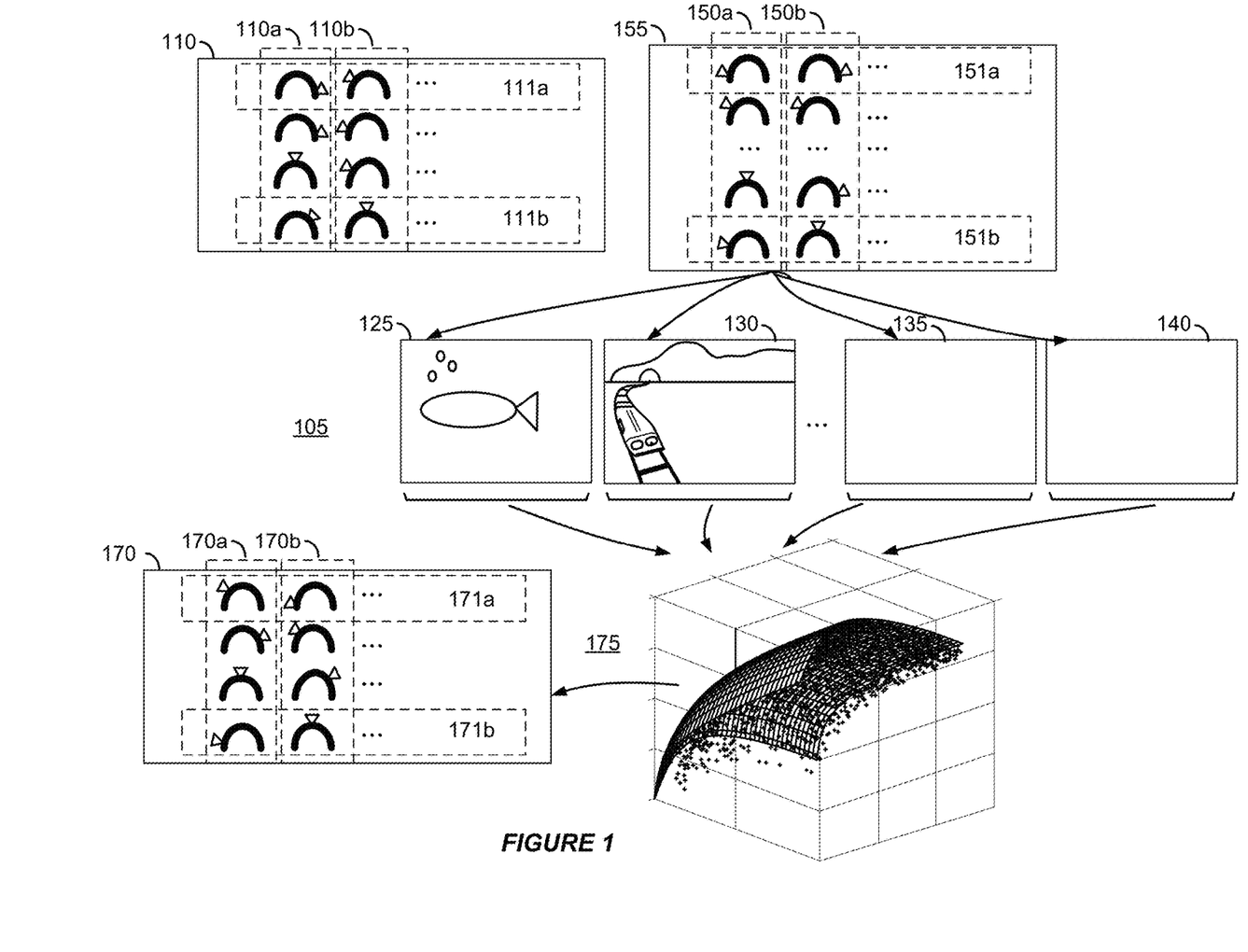
FIG. 1 illustrates an example of optimizing encoding ladders.

FIG. 1 illustrates an example of encoding media content with an optimized encoding ladder (i.e., a set of encoding profiles tailored to the characteristics of the media content being encoded). In FIG. 1, media content 105 includes video titles 125, 130, 135, and 140, with at least two of the video titles having different characteristics. For example, video title 125 is computer-generated image (CGI) content, and video title 130 is live-action content.

FIG. 1 depicts default encoding ladder 110 with four "rungs," each rung corresponding to a particular encoding profile (i.e., a particular set of encoding parameter values for various resolutions and bitrates). Encoding ladders allow delivery of a range of viewing experiences to users connecting with different devices over varying bandwidths. A particular encoding ladder is configured to make tradeoffs between resources consumed during the encoding/decoding process (e.g., processing time, bandwidth, storage, etc.) and visual quality.

In FIG. 1, each encoding profile in encoding ladder 110 (e.g., profiles 111a and 111b) includes an encoding parameter 110a. Encoding parameter 110a corresponds to image resolution, and can take on the four values of UHD, 1080p, 720p, and 576i, with each encoding profile in default encoding ladder 110 corresponding to a different image resolution value. FIG. 1 also depicts that each encoding profile in ladder 110 has an encoding parameter 110b. Encoding parameter 110b corresponds to a quantization parameter, which represents a factor applied to residual coefficients that indicate differences in image content between different portions, or coding units, of an image frame to scale down the residual coefficients as a compression technique. Encoding parameter 110b can have a range of values, such as, for example, from 0-51. In FIG. 1, encoding profile 111a (corresponding to the UHD resolution) has a low quantization parameter value that results in less compression and higher quality, and encoding profile 111b (corresponding to the 576i resolution) has a high quantization parameter value that results in more compression and lower quality.

In some scenarios, default encoding ladder 110 corresponds to an encoding ladder that is applied to media content 105 irrespective of the characteristics of media content 105. That is, default encoding ladder 110 is applied to video titles 125, 130, and other video titles in media content 105, resulting in each of the video titles in media content 105 being encoded as multiple representations corresponding to each of the encoding profiles in default encoding ladder 110.

However, a default encoding ladder may not be well-suited for the particular set of video titles in media content 105. For example, a particular value for an encoding parameter setting such as the quantization parameter may provide a high quality encoding of the video titles including CGI or animated scenes. However, the video titles including live-action content might not be encoded as well since the parameter settings for high quality encodings of live-action content is different from CGI or animated content. Therefore, if media content 105 contains a majority of live-action content, but the default encoding ladder is tailored to animated content, a large portion of media content 105 will be encoded with poor quality.

In FIG. 1, rather than using default encoding ladder 110, adaptive encoding ladder 170 can be determined based on trial encodings of a sampling of content from media content 105.

For example, in FIG. 1, trial encoding profiles 155 can be used to encode video titles 125, 130, 135 and 140. The values for the encoding parameters in each encoding profile contained in trial encoding profiles 155 (portrayed as gauges being dialed to different values) may span a wide range to account for the different possible characteristics of the video titles in media content 105.

For example, for encoding profile 151a in trial encoding profiles 155, since video title 140 mainly includes smooth, uniform imagery, a high value for encoding parameter 150b, which corresponds to a quantization parameter, results in a point in data space 175 representing a high quality, low bit rate, and low encoding runtime.

By contrast, the same encoding profile 151a used to encode video title 130, which includes live-action scenery, may be poor quality based on the high value for encoding parameter 150b, thereby resulting in a point representing a low quality, low bit rate, and low encoding runtime encoding output in data space 175.

As a result of encoding each sample from media content 105 using each of the encoding profiles in the trial encoding profiles 155, numerous points are generated in data space 175. For example, for trial encoding profiles 155 having 100 different encoding profiles, and 10 samples from media content 105, 100×10=1000 points are generated in data space 175.

The generated set of points in data space 175 is pruned and used as inputs to an optimization function to determine adaptive encoding ladder 170. For example, points that correspond to quality values below a threshold are pruned. Similarly, points that correspond to encoding runtimes that exceed a threshold are pruned. A performance boundary curve is generated based on the pruned points in data space 175. An optimization function is then applied to the pruned points in data space 175 to satisfy a constraint function relative to the performance boundary curve. For example, a predetermined number of points, such as four, are selected from the pruned points in order to maximize the volume covered in data space 175 under the performance boundary curve. Each of these four points corresponds to a particular encoding profile, and the set of four points identify the encoding profiles to include in adaptive encoding ladder 170. The disclosed technique for determining adaptive encoding ladder 170 allows for an encoding ladder that is tailored to the characteristic of the sampled video titles from media content 105, and therefore provides better compression and/or better video quality for the particular characteristics of the video titles in media content 105.

Figure 2:
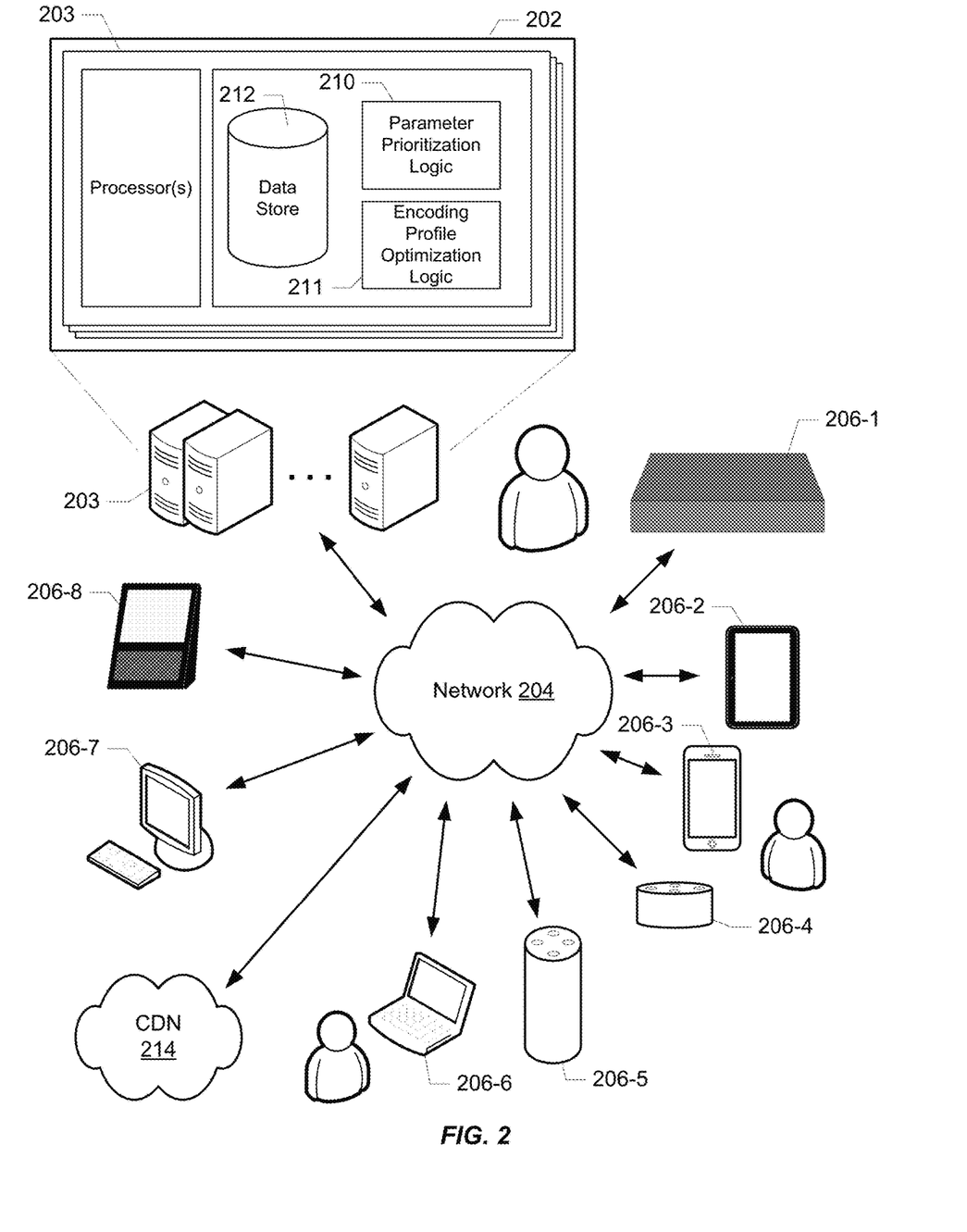
FIG. 2 illustrates an example of a computing environment for optimizing encoding ladders.

FIG. 2 illustrates an example of a computing environment in which video streams may be adaptively encoded for transmission via network 204 to a variety of client devices (206-1 through 206-8) in accordance with the techniques described herein. Service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and generating and/or consuming content streams. Such devices may include, for example, mobile devices (e.g., cell phones, smart phones, tablets, and the like), personal computers (e.g., laptops and desktops), set top boxes (e.g., for cable, satellite, and online systems), smart televisions, gaming consoles, wearable computing devices (e.g., smart watches or smart glasses), internet-connected cameras, voice-activated smart home devices (e.g., with integrated personal digital assistants), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling service 202. Alternatively, such resources may be independent of service 202, e.g., on a platform under control of a separate provider of services and/or computing resources with which service 202 connects to consume resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

It should also be noted that implementations are contemplated in which, in addition to encoding parameter prioritization logic 210 and encoding profile optimization logic 211, service 202 may include other types of logic (not shown) involved in the delivery of content as part of a video-on-demand service or a live/broadcast video service.

In addition to adaptively encoding video content and providing access to video streams, service 202 may also include a variety of information related to the video content (e.g., other associated metadata and manifests in data store 212 which service 202 uses, or to which service 202 provides access). Data store 212 may also include data representing cost functions, constraints, historical information, machine learning models and encoding profiles implemented and generated as described herein. Alternatively, any of this information may be provided and/or hosted by one or more separate platforms, e.g., content delivery network (CDN) 214 or other third-party platform. It should be noted that, while logic 210 and 211, and data store 212 are shown as integrated with service 202, implementations are contemplated in which some or all of these operate remotely from the associated service, and/or are under the control of an independent entity. Those of skill in the art will understand the diversity of use cases to which the techniques described herein are applicable.

Figure 3:
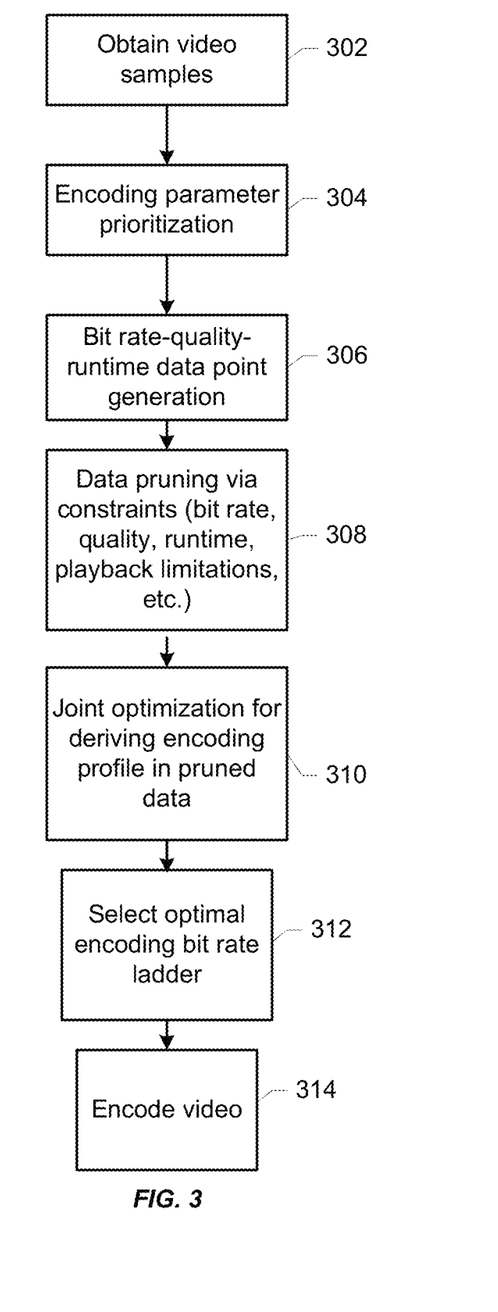
FIG. 3 is a flowchart illustrating the generation of an optimized encoding ladder.

FIG. 3 illustrates a flowchart for generating an adaptive encoding ladder for media content.

In a class of implementations, generating an adaptive encoding ladder includes obtaining video samples (302) for performing trial encodes to generate points for a data space. Referring to FIG. 1, media content 105 contains multiple video titles. For clarity purposes, FIG. 1 depicts four video titles, though it should be appreciated that media content 105 contains more than the four depicted video titles. Furthermore, FIG. 1 depicts that the four video titles 125, 130, 135 and 140 are included in the samples of media content 105 that are encoded using trial encoding profiles. It should further be appreciated that the number of samples of media content 105 can include more than the four video titles shown in FIG. 1.

The video titles to include in the samples may be adaptive based on analysis of the characteristics of media content 105. For example, the complexity of different content types, such as animation, live-action, or other type of content can be determined by analyzing their image content. In some implementations, animated content can be determined by analyzing a video title and determining that it includes a certain threshold range or number of small blocks (e.g., small coding units (CUs) of an image frame corresponding to residual coefficients, as previously discussed) having sharp areas, larger blocks having smoother areas but a level of detail below a threshold level of detail, etc. By contrast, live-action content might have more blurred edges rather than sharp edges, gradual colors rather than sudden color changes as in animation, etc.

The video titles included in the samples provide a representative subset of media content 105. For example, media content 105 may contain thousands of video titles, whereas only a few hundred are selected as samples for performing trial encodings due to computation time limitations. In one example, if media content 105 is approximately a half CGI content and a half live-action content, the samples reflect this apportioning between CGI and live-action content such that the adaptive encoding ladder does not correspond to encoding profiles that over emphasize CGI content over live-action content (or vice versa).

The disclosed techniques are compatible with a wide range of content encoding parameters. Examples of encoding parameters include but are not limited to one or more of a Group Of Pictures (GOP) structure, entropy coding mode (Context-adaptive binary arithmetic coding (CABAC)/Context-adaptive variable-length coding (CAVLC)), number of reference frames, interlace coding support, motion search range, motion search algorithm, intra/inter encoding partition size, intra/inter encoding partition size mode decision, intra prediction mode decision, Picture-adaptive frame-field coding (PAFF) decisions, Macroblock-adaptive frame-field (MBAFF) coding decisions, macro block (MB) level quantization parameters, deblocking filter strength, quantization scaling matrices, quantization rounding offsets, Lagrangian multipliers for rate-distortion (RD) optimization, various thresholds to bias mode decision, adaptive-quantization mode, adaptive-quantization strength, constant rate factor, inter noise reduction level, quantization group size, sub-pixel motion estimation method, quantization approach, discrete cosine transform (DCT) size, the use of mixed references, and so forth.

It should be appreciated that an optimal encoding profile (i.e., set of encoding parameter values resulting in the least encode time per frame, the lowest bit rate, and the highest quality, such as a PSNR of the luma component) can be found by encoding a video sample over all possible encoding parameter values. However, an exhaustive search is time consuming.

For example, using the open source x264 encoder for the H.264 standard, trial encoding profiles 155 in FIG. 1 can include different values for encoding parameters including but not limited to adaptive-quantization mode (aq-mode parameter), the number of reference frames (ref parameter), the sub-pixel motion estimation method (subme parameter), the partition size for intra and inter motion compensation (part parameter), and the quantization approach (trellis parameter).

Adaptive quantization varies the quantizer for each individual macroblock within each frame to avoid blur/blocking in flat areas containing fine/edge detail, such as calm water, sky and animation. The aq-mode encoding parameter can correspond to the values of 0: Do not use (adaptive quantization) AQ at all, 1: Allow AQ to redistribute bits across the whole video and within frames, or 2: Auto-variance AQ which attempts to adapt AQ strength per-frame.

The subme encoding parameter can be 7 different values relating to the number of iterations for motion estimation.

The ref encoding parameter can be 16 different values specifying from one to a maximum of 16 reference frames.

The part encoding parameter can be 10 different values that specify the partition size for intra (I), predictive (P) and bi-predictive (B) macroblocks.

The trellis parameter can be 4 different values that include uniform quantization with and without context adaptive arithmetic coding (CABAC), and other options for finding the quantization for a block of DCT coefficients.

Exhaustive searching over the possible values for these example encoding parameters requires 13,440 encodings for a video sample (3×7×16×10×4). It should be appreciated that additional x264 encoding parameters (e.g., the DCT size (dct), the motion estimation method (me), the motion search method (ms), the use of mixed reference (mixed-refs), etc.), each having their own range of possible values, further increases the number of permutations for an exhaustive search. Moreover, the number of encodings to perform further involves multiplication by the number of video samples.

In a class of implementations, generating an adaptive encoding ladder includes encoding parameter prioritization (304). Instead of relying on an exhaustive search, a limited set of encoding profiles is selected for trial encoding profiles 155. Continuing the previous example, a limited set of encoding profiles out of the 13,440 possible permutations for the 5 example encoding parameters discussed above is selected. For instance, trial encoding profiles 155 includes encoding profiles that use each of the three possible values for adaptive quantization. In contrast, for the subme encoding parameter which has 7 options, trial encoding profiles 155 only includes two of the seven options. For the ref encoding parameter corresponding to the number of reference frames, 4 of the 16 different available values, such as 1, 6, 11, and 16 reference frames, are included in trial encoding profiles 155. For the part encoding parameter, the original 10 different values that specify the partition size for intra (I), predictive (P) and bi-predictive (B) macroblocks are included in trial encoding profiles 155. However, for the trellis parameter, only one option, such as uniform quantization with context adaptive arithmetic coding, is included in trial encoding profiles 155.

For the given example, a search over all possible values for trial encoding profiles 155 involves 240 encodings for a video sample (3×2×4×10×1), which is significantly fewer than the 13,440 total possible permutations prior to encoding parameter prioritization. It should be appreciated that for adaptive encoding ladder determination, the example of 240 permutations can be multiplied by the range of values for other encoding parameters in a particular encoding profile, such as multiplying by four for the scenario where each video sample can take on the image resolution values of UHD, 1080p, 720p, or 576i, and may also need to be multiplied by the number of video samples.

It should be noted in the example that the range of values used in trial encoding profiles 155 was not reduced for encoding parameters such as adaptive quantization (3 values) and the partition size encoding parameter (10 values). However, the range of values for other encoding parameters are reduced, such as for the subme encoding parameter (from 7 to 2), for the ref encoding parameter (from 16 to 4), and for the trellis parameter from (4 to 1). The analysis of which encoding parameters to reduce the range of values for, and the extent to reduce the range of values by, is performed during an encoding parameter prioritization process.

In the encoding parameter prioritization (304) step of FIG. 3, encoding parameters can be assigned a particular value, such as a priority value. The relative priority values between encoding parameters reflects whether the possible range of values for the encoding parameter is reduced in the limited number of encoding profiles in trial encoding profiles 155.

As an example, the adaptive quantization mode is assigned a high priority value, and therefore there is no reduction in the possible range of values for adaptive quantization in trial encoding profiles 155. In other words, the trial encoding profiles 155 results in testing all 3 possible values for adaptive quantization mode.

As another example, the ref encoding parameter is assigned a priority level that is lower than the adaptive quantization mode priority level, indicating there is a reduction in the possible range of values for the number of reference frames in trial encoding profiles 155, specifically from 16 possible values to 4 possible values.

As a further example, the trellis encoding parameter is assigned a priority level that is lower than the ref encoding parameter priority level, indicating there is an even greater reduction in the possible range of values for the quantization approach encoding parameter in trial encoding profiles 155, specifically from 4 possible values to 1 possible value.

By performing encoding parameter prioritization, the limited number of encoding profiles in trial encoding profiles 155 are selected to represent optimal coverage of a data space that encompasses all of the sets of values of encoding parameters represented by the overall possible permutation of encoding profiles. Examples of dimensions of the data space include a combination of bit rate, quality, and encoding runtime. Ensuring that the limited number of encoding profiles provides broad coverage of the data space contributes to greater computational efficiency (i.e., fewer redundant trial encoding outputs that provide insignificant variation along dimensions in the optimization data space), and a more accurate estimation of a performance boundary curve. In some implementations, the performance boundary curve is used for a multidimensional optimization function to derive the particular encoding profiles for adaptive encoding ladder 170.

For example, if the majority of encoding profiles in trial encoding profiles 155 correspond to numerous different values for encoding parameters with little impact on quality, bit rate, and encoding runtime, the encoding outputs will result in a tight cluster in data space 175. One example of an encoding parameter with low priority is the number of b frames. In turn, the estimated performance boundary curve derived from the tight cluster may not be an accurate representation of the true performance boundary curve that would be obtained through an exhaustive search. In contrast, if trial encoding profiles 155 results in encoding outputs in data space 175 that correspond to a wide range of quality, bit rate, and encoding runtimes, the estimated performance boundary curve may be a more accurate representation of the true performance boundary curve. Examples of encoding parameters with high priority include but are not limited to adaptive-quantization mode, adaptive-quantization strength, constant rate factor, inter noise reduction level, or quantization group size.

In a class of implementations, assigning priority values to encoding parameters includes obtaining video samples, performing a set of trial encodes, and clustering the trial encoding outputs using an unsupervised clustering technique. Any of a variety of clustering algorithms and associated models may be used such as, for example, a k-means clustering algorithm, an expectation-maximization clustering algorithm, a mean shift clustering algorithm, a hierarchical clustering algorithm, density-based clustering, grid-based clustering, as well as other clustering algorithms based on neural networks, etc. This clustering results in sets of encoding outputs. Because the set of encoding outputs associated with a cluster includes encoding profiles with identical values for certain encoding parameters, and different values for certain other encoding parameters, the extent to which a change in the value of an encoding parameter contributes to a trial encoding output being within a particular cluster or a different cluster can be determined.

For example, encoding parameters in which a change in value results in the corresponding trial encoding output being in a different cluster are associated with high priority values. By contrast, encoding parameters in which a change in value results in the corresponding trial encoding output being in the same cluster are associated with low priority values. Therefore, encoding parameters can be differentiated based on their impact on separating trial encoding outputs samples across clusters, and as a result, a priority level can be associated with certain encoding parameters.

In some implementations, encoding parameter prioritization can be predetermined in a one time, off-line process. In certain implementations, the encoding parameter prioritization process can be performed as part of the generation of an adaptive encoding ladder. It should be appreciated that the encoding parameter prioritization process may use a set of video samples that is the same as the video samples being used to generate the adaptive encoding ladder, or the encoding parameter prioritization process may use a different set of video samples. It should further be appreciated that because the number of values that a particular encoding parameter can be assigned may vary, the priority level is not necessarily indicative of the number of values included in trial encoding profiles 155. For example, a high priority encoding parameter may have only two values, whereas a less significant encoding parameter may have a range of 16 different values.

In a class of implementations, the encoding parameter prioritization process can be used as a tie breaker. For example, when two different encoding profiles result in the same point or nearly the same point in data space 175, the encoding profile in which a higher priority encoding parameter is being varied will be retained, and the encoding profile in which a lower priority encoding parameter is being varied will be eliminated. This reduces the total number of trial encoding outputs to generate, and causes the generated trial encoding outputs to account for the higher priority encoding parameter.

In a class of implementations, the encoding ladder optimization includes data point generation (306) for a multi-dimensional data space. Examples of dimensions of the data space include any combination of bit rate, quality, encoding runtime, network bandwidth, playback device limitations, end-user distribution and geographic constraints, etc. It should be appreciated that the dimensions of the data space may correspond to system constraints for the design of a video streaming service.

For example, the quality level for video played back to a customer of a video streaming service is a design constraint, therefore data point generation (306) uses a data space including a video quality level dimension. In certain implementations, the quality level corresponds to a quality metric algorithm that compares the compressed video with a reference source and outputs a value that predicts how viewers would rate the quality of the compressed video. A person having ordinary skill in the art would recognize that the disclosed techniques are compatible with a wide range of quality metric algorithms, including the Peak Signal-to-noise Ratio (PSNR), Structural Similarity Index (SSIM), Video Multimethod Assessment Fusion (VMAF), etc.

In certain implementations, the data space may also include a dimension for bit rate, such as kilobits per second (kbps). Such a dimension is indicative of the network bandwidth required for transmission of a segment of media content from a content delivery network edge server to a viewer device, and is also indicative of the viewer device content buffer requirements during playback of the downloaded segment of media content at the viewer device.

It should be appreciated that the data space may include dimensions that do not correspond to content playback characteristics. For example, one dimension in data space 175 may be encoding runtime, such as the amount of time to encode each frame in a particular video title. Such an attribute relates to the encoding process, rather than relating to decoding or playback at a viewer device.

Since data space 175 is multidimensional, each generated data point corresponds to a vector. It should be noted that each data space vector corresponds to the encoding parameter values vector for a particular encoding profile in trial encoding profiles 155. A wide variety of techniques can be used to represent the data space vectors and the encoding parameter values vectors. For example, one point in data space 175 may be the data space vector {quality: 75, bit rate: 1950 kbps, encoding runtime per frame: 273 ms}. In some implementations, for a set of encoding parameters (such as the five parameters of aq-mode, subme, ref, part and trellis), with each parameter having n possible options, (such as n=3, 7, 16, 10 and 3, respectively, for the five example encoding parameters), an example of an encoder parameter values vector associated with the data space vector {quality: 75, bit rate: 1950 kbps, encoding runtime per frame: 273 ms} is the vector {2, 1, 2, 1, 3}, which specifies the ×264 encoder for the H.264 standard with adaptive quantization mode enabled, the fastest sub-pixel motion estimation scheme; two reference frames; a partition size of P8×8; and the use of trellis algorithm for quantization and CABAC for entropy coding.

Each data space vector and the corresponding encoding parameter values vector can be stored, for example, in a lookup table in a log file in encoder info 215. Therefore, following operations such as filtering certain points in data space 175 and multidimensional optimization, the underlying encoding parameter values vector for the remaining data space vectors can be looked up for the purposes of determining encoding profiles to include in adaptive encoding ladder 170.

In a class of implementations, the encoding ladder optimization includes data pruning based on constraints (308). As previously described, examples of dimensions of the data space include any combination of bit rate, quality, encoding runtime, etc. Pruning of the points can be applied to particular dimensions of the data space. For example, pruning can be applied to ensure a minimum quality level by filtering out data points with a quality level below a threshold.

Figure 4A:
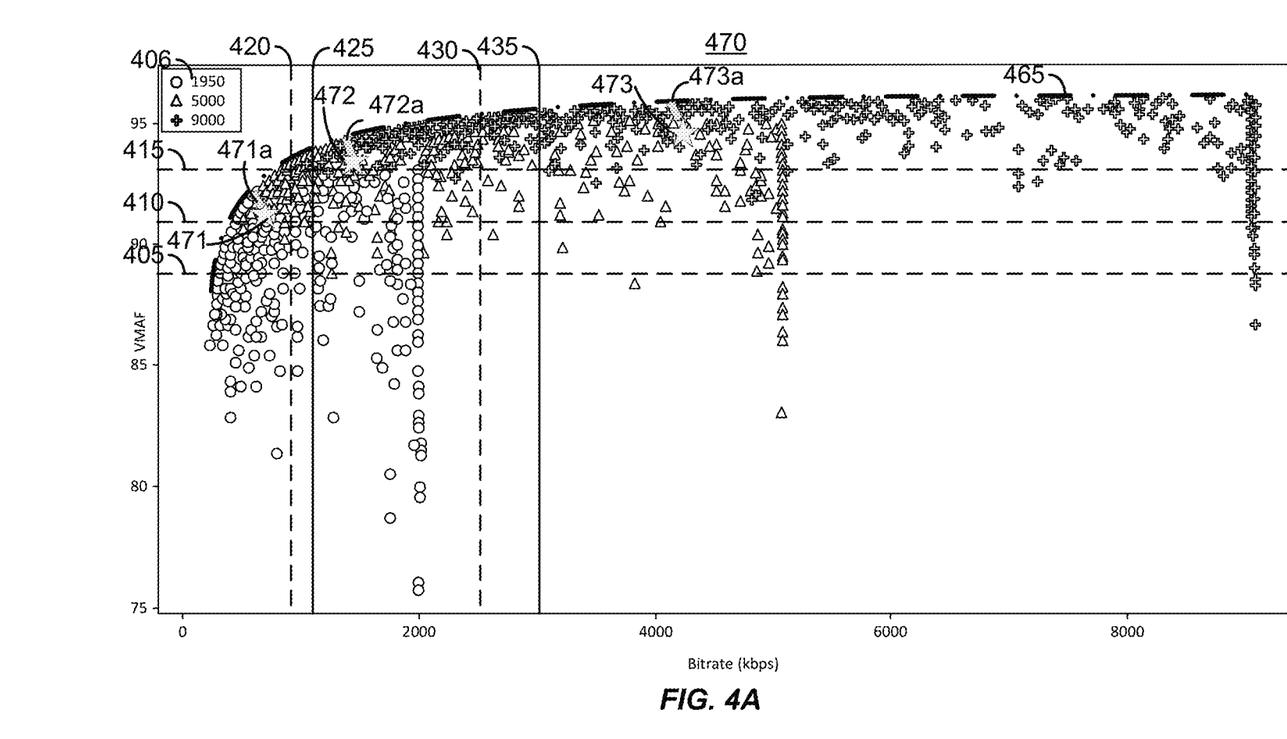
FIGS. 4A-B illustrates examples of data spaces for optimizing encoding ladders.

For example, FIG. 4A illustrates a data space with two dimensions. It should be appreciated that the data space may be greater than two dimensions, but for clarity purposes, FIG. 4A only depicts a data space 470 with the dimensions of quality along the vertical axis using the VMAF quality metric, and actual bit rate along the horizontal axis in units of kbps. The VMAF quality metric is determined for each particular trial encoding output by, for example, comparing the compressed video with a reference source. The actual bit rate is determined by, for example, referencing log files generated during the encoding process, by dividing the file size by the duration of the video sample (e.g., number of frames divided by the frames per second), etc.

It should further be appreciated that each dimension can be any of a wide variety of metrics/units other than quality or actual bit rate.

The encoding profiles corresponding to the points in FIG. 4A use three different maximum bit rate settings, specifically, 1950 (represented by the circle marks), 5000 (represented by the triangle marks), and 9000 (represented by the plus marks) maximum kbps, as indicated by the legend 460. For example, the circle marks in FIG. 4A depict the actual bit rates for the trial encoding outputs for all encoding profiles that include a value of 1950 for the maximum bit rate encoder parameter setting, as represented by the distribution of circle marks to the right of the 0 kbps and slightly to the left of the 2000 kbps horizontal axis ticks. These same circle marks also represent quality metric values (with higher values corresponding to higher quality for the VMAF quality metric), as represented by the range of values on the vertical axis between slightly above 75 to slightly below 94.

For the trial encoding outputs for all encoding profiles that include a value of 1950 for the maximum bit rate encoder parameter setting, the horizontal dashed line corresponding to threshold 405 represents a quality threshold. For example, all the circle marks below the threshold 405 are pruned, representing that circle marks with a VMAF quality metric level below about 88 are excluded as input points for determining an adaptive encoding ladder.

In a class of implementations, pruning based on constraints can be applied to ensure a minimum separation along a particular dimension of the data space for different encoding profiles within an optimized encoding ladder. For example, the vertical dashed line corresponding to statistical measure 420 represents an average bit rate for the circle marks, and the vertical solid line corresponding to threshold 425 represents a bit rate that is 20% higher than the average bit rate of statistical measure 420. Triangle marks with an actual bit rate to the left of threshold 425 are excluded as input points for determining an adaptive encoding profile for the triangle marks (i.e., 5000 kbps maximum bit rate setting). In other words, for this example, threshold 425 is calculated using the trial encoding outputs for encoding profiles that include a value of 1950 for the maximum bit rate encoder parameter setting, and threshold 425 is being used to prune trial encoding outputs for encoding profiles that include a value of 5000 kbps for the maximum bit rate encoder parameter setting. Similarly, threshold 435 is set to 20% above the average bit rate for the triangle marks (i.e., 5000 kbps maximum bit rate setting), and threshold 435 is being used to prune trial encoding outputs for encoding profiles that include a value of 9000 kbps for the maximum bit rate encoder parameter setting. It should be appreciated that these examples of constraints (e.g., a margin of 20% greater than average bit rates) causes the set of encoding profiles in the adaptive encoding ladder to cover a wider range for a particular dimension (e.g., a wider range of bit rates) of the data space.

It should be appreciated that constraints for a particular dimension can involve a maximum threshold, a minimum threshold, or both maximum and minimum thresholds. It should further be appreciated that a wide variety of statistical measures other than an average, and margin values other than 20%, can be used for deriving constraints for any particular dimension. In a class of implementations, constraint values and/or statistical measures for deriving constraint values can be based on historical data. For example, the thresholds 425 and 435 for the actual bit rate may be configured based on network bandwidth characteristics for a previous six month period.

It should be noted that in the example of data pruning (308) shown in FIG. 4A, the circle marks corresponding to the trial encoding outputs for all encoding profiles that include a value of 1950 for the maximum bit rate encoder parameter setting are pruned along multiple dimensions in data space 470, including the quality dimension based on threshold 405, and the actual bit rate dimension based on threshold 425. However, in this example, the pruning in a particular dimension is independent of other dimensions in the data space 470. For instance, the pruning of points based on a minimum quality value is performed independently of the corresponding values of the points in the actual bit rate data space dimension (and vice versa).

It should be appreciated that the value for a threshold for pruning along a particular dimension can be a function of encoding parameter values. For example, the horizontal dashed lines corresponding to thresholds 405, 410, and 415 are at different quality metric values. This represents that for each of the three different maximum bit rate settings illustrated in FIG. 4A, 1950, 5000, and 9000 maximum kbps, a different quality metric value is used for thresholds 405, 410, and 415 (a higher maximum bit rate corresponds to a higher quality cutoff). As another example, the vertical solid lines corresponding to thresholds 425 and 435 (which are each 20% greater than the average values indicated by statistical measures 420 and 430) are at different bit rate values. This represents that for each of the three different maximum bit rate settings, a different bit rate constraint is used for thresholds 425 and 435 (a higher maximum bit rate corresponds to a higher bit rate cutoff). It should further be appreciated that the value for a threshold for any dimension is not limited to being a function of maximum bit rate, and can be a function of any encoding parameter (resolution, quantization, etc.)

It should be noted that a value for a threshold may be independent of the value of encoding parameters. For example, all trial encoding outputs with an encoding runtime per frame exceeding a certain threshold are pruned, regardless of the value of the maximum bit rate encoding parameter, or the value of any other encoding parameter in the encoding profile.

Changing an encoding parameter value can simultaneously affect multiple data space dimensions, such as bitrate, encoding speed, and video quality. Thus, following the data space pruning process, the optimal selection of encoding parameter profiles for an adaptive encoding ladder is a multi-dimensional optimization problem. The joint-optimization (310) involves accounting for tradeoffs along multiple dimensions (e.g., bitrate, encoding speed, and video quality) based on a cost function.

A cost function can be tailored to particular streaming video service system design goals. Cost function choices include but are not limited to (1) minimizing bit rate for a given quality constraint, (2) maximizing quality for a given bit rate constraint, (3) minimizing bit rate given quality and encoding runtime constraints, or (4) maximizing delivered quality (measured at the playback devices) given, for example, bit rate, network bandwidth, and playback device constraints.

According to a particular implementation, the encoding profiles for an encoding ladder are generated using a cost function based on rate-distortion optimization. That is, the data points representing trial encodings of the video samples are distributed in two-dimensions (in which one dimension is bit rate and the other quality), or three-dimensions (adding the runtime dimension), or any n-dimensional space including bit rate and quality. For example, for the two-dimension case, the rate-distortion cost function determines points with the desired balance between bit rate and quality within the pruned data points. The encoding profiles corresponding to the points identified by the rate-distortion cost function include associated video frame resolutions. Based on particular video frame resolutions to provide to client devices, a particular encoding ladder can be selected. An example will be instructive.

Figure 4B:
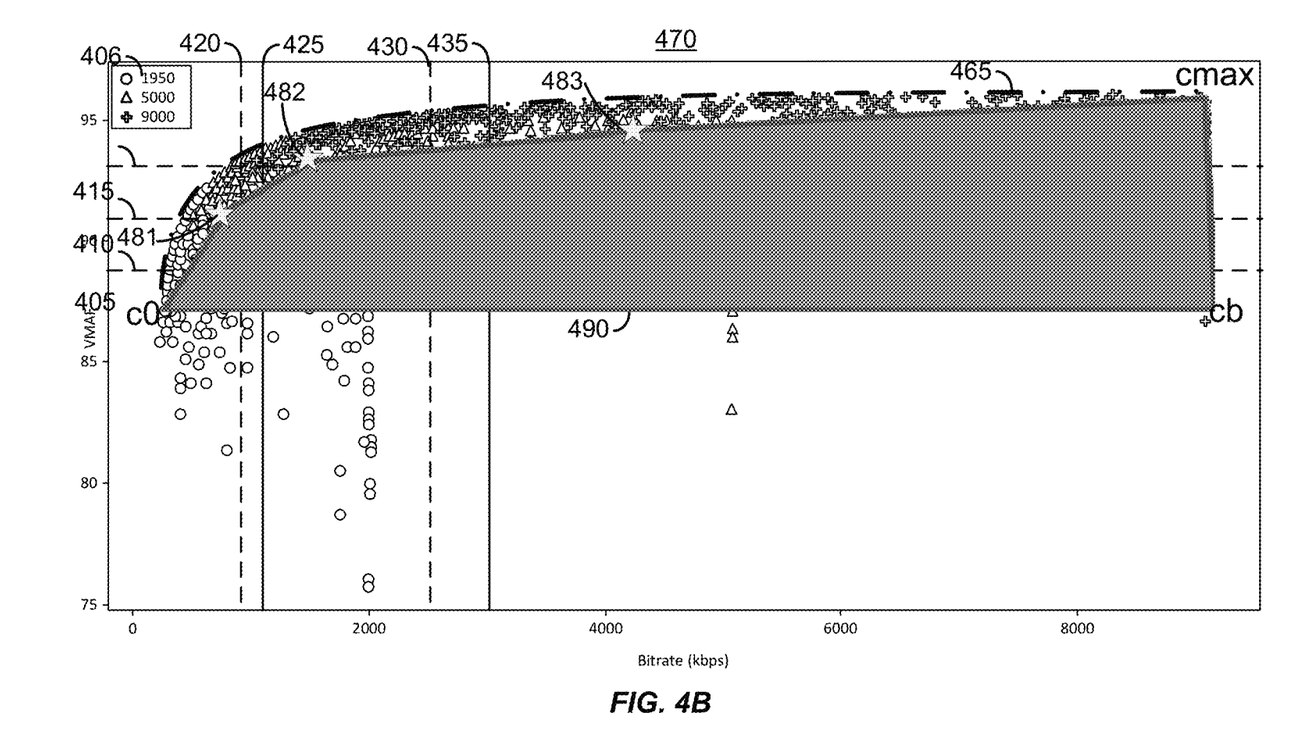

FIG. 4A and FIG. 4B are illustrations of sample data spaces and sample cost function choices.

It should be noted that data space 470 of FIG. 4A and FIG. 4B can correspond to trial encoding outputs for an arbitrary range of different values for an arbitrary number of encoding parameters across n-dimensions, in contrast to a limited range of values for only one or two encoding parameters, such as a particular set of quantization parameter values (or constant rate factor values) mapped to a particular set of resolutions across 2-dimensions.

The joint-optimization (310) includes performing a curve fitting operation to generate a curve equation representing a performance boundary curve. Referring to FIG. 4A, performance boundary curve 465, depicted by the dashed curve, is determined by fitting a curve equation to points corresponding to the peak quality (i.e., a maximum vertical axis value) achieved at the actual bit rates (i.e., a horizontal axis value) across all trial encoding outputs. For example, in FIG. 4A, for any chosen actual bit rate, the corresponding quality is below the performance boundary curve. The performance boundary curve is an abstraction of the highest quality that can be achieved at a particular actual bit rate across all the pruned permutations of encoding profiles in trial encoding profiles 155. It should be appreciated that the performance boundary curve can be generated based on the pruned data points in data space 470 using a variety of curve fitting techniques that minimize the distance between the performance boundary curve and the peak quality levels achieved at each actual bit rate. In the example of FIG. 4A, the curve fitting operation results in performance boundary curve 465 that corresponds to a convex contour, though in other implementations, the performance boundary curve may have different characteristics.

FIG. 4A and FIG. 4B illustrate two examples of how the performance boundary curve 465 can be used with different cost functions. It should also be noted that while FIG. 4A and FIG. 4B illustrate different cost functions, both can utilize the same data space pruning process as described for step 308, and both can involve the same performance boundary curve.

FIG. 4A illustrates using a distance-based cost function to determine an optimal encoding ladder for a bitrate-quality data space. Specifically, three encoding profiles, profile 471, 472, and 473, are represented by the stars in FIG. 4A. Profile 471 is associated with the pruned trial encoding outputs for encoding profiles that include a value of 1950 for the maximum bit rate encoder parameter setting. Profile 472 similarly corresponds to the 5000 kbps maximum bit rate, and profile 473 similarly corresponds to the 9000 kbps maximum bit rate. In addition to optimizing the bitrate-quality trade-off within a particular maximum bit rate encoder parameter value, the distance-based cost function utilized in FIG. 4A accounts for bit rate-quality trade-offs across the three maximum bit rate settings by minimizing the sum of the distances of the three star points illustrated by profile 471, 472, and 473 to performance boundary curve 465. The distance-based cost function jointly minimizes the aggregate distances (e.g., the sum of the three vectors 471a, 472a, and 473a that are perpendicular to performance boundary curve 465) and the per-maximum bit rate distances (e.g., the individual vectors 471a, 472a, and 473a that are perpendicular to performance boundary curve 465). For example, the cost function will select encoding profiles with distances for vectors 471a, 472a, and 473a that equal 1, 1, and 1, rather than encoding profiles with distances that equal 0.25, 0.25, and 2.5, even though both sum to the same value of 3. This is because, for example, the distances of 1, 1 and 1 correspond to a lower peak deviation from the performance boundary curve for each maximum bit rate setting. One of ordinary skill in the art would recognize that a wide variety of optimization algorithms can be used to determine the encoding profiles corresponding to profile 471, 472, and 473 used to optimize a distance-based cost function. For the example of FIG. 4A, algorithms including but not limited to least-squares, linear programming, and variants of heuristic-based search algorithms can be used to perform convex optimization.

The profiles to include in the optimal encoding ladder are selected (312) based on the results of the joint optimization process. Specifically, profile 471 is used as the encoding profile for the rung of the encoding ladder with the 1950 kbps maximum bit rate, profile 472 is used for the rung of the encoding ladder for the 5000 kbps maximum bit rate, and profile 473 is used for the rung of the encoding ladder for the 9000 kbps maximum bit rate.

The video titles of media content 105 of FIG. 1 are encoded (314) with the encoding profiles corresponding to each rung of the encoding ladder.

FIG. 4B illustrates using an area-based cost function to determine an optimal encoding ladder for a bitrate-quality data space. Profile 481 is associated with the pruned trial encoding outputs with 1950 kbps for the maximum bit rate, profile 482 corresponds to the 5000 kbps maximum bit rate, and profile 483 corresponds to the 9000 kbps maximum bit rate. The area-based cost function utilized in FIG. 4B, similar to the distance-based cost function of FIG. 4A, accounts for bit rate-quality trade-offs across the three maximum bit rate settings. However, rather than minimizing the sum of the distances of the three star points, the area-based cost function maximizes the area under the performance boundary curve 465 formed by the polygon 490 having the six vertices at profile 481, 482, and 483, and points cmax, c0, and cb. It should be appreciated that by maximizing the area, the cost-function of FIG. 4B is minimizing the area corresponding to the deviation between the polygon 490 and the performance boundary curve 465. In a class of implementations, relative to the distance-based cost function, the area-based cost function provides more degrees of freedom in optimizing the relationship between different encoding profiles in the adaptive encoding ladder. For example, there may be various sets of points for profile 481, 482, and 483 that result in the same set of distances to performance boundary curve 465, but the various sets of points may correspond to different areas under the performance boundary curve 465, with one set of points corresponding to a maximum area. It should further be appreciated that because the cost function for FIG. 4B involves six points, specifically, profile 481, 482, and 483, and points cmax, c0, and cb, more flexibility is provided relative to the cost function for FIG. 4A, which involves three points, specifically, profile 471, 472, and 473. For example, for the area-based cost function of FIG. 4B, the additional configurability of the points cmax, c0, and cb provide more freedom in emphasizing different ends of the performance boundary curve 465 (e.g., adjusting the cmax point corresponding to the point with the highest quality, or adjusting the c0 point corresponding to the point with the lowest quality). As one example, by adjusting cmax to alter the area under the portion of the performance boundary curve 465 corresponding to higher bit rates, for the encoding profiles selected for the encoding ladder (312), the quality to bit rate tradeoff can be weighted to favor greater quality for the 9000 kbps maximum bit rate, and a lower quality for the 1950 kbps maximum bit rate.

It should be appreciated that even though FIG. 4A and FIG. 4B illustrates only the 2-dimensional data space (i.e. bit rate and quality data space) for clarity purposes, the described techniques can be applied to any n-dimensional space to satisfy various constraints superimposed by any combination of bit rate, quality, encoding runtime, network bandwidth, playback devices limitations, end-user distribution and geographic constraints, etc.

It should be appreciated that video samples as referred to herein may be entire video presentations (e.g., an entire movie or sportscast), groups of video presentations, or may be shorter segments within a presentation, e.g., 2-60 second segments including one or more 2-10 second fragments or "groups of pictures" (GOPs).

It should be noted that the techniques described herein are agnostic to specific codec implementation, and may be employed to configure encoders implemented according to any of a wide variety video compression standards including, for example, Advanced Video Coding (AVC) or H.264, High Efficiency Video Coding (HEVC) or H.265, AV1, VP8, and VP9, as well as future standards, e.g., H.266.

It should further be appreciated that the disclosed techniques are compatible with both live and on demand applications, and are applicable to video, audio, and other forms of media content.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
selecting a subset of a plurality of encoding profiles, each encoding profile including a unique set of values for a set of encoding parameters, the selected encoding profiles representing optimal coverage of a first data space that encompasses all of the sets of values of encoding parameters represented by the plurality of encoding profiles;
encoding each of a plurality of first video samples in a set of media content using each of the plurality of encoding profiles thereby generating a first plurality of encoded video samples;
determining values for a plurality of attributes for each of the first plurality of encoded video samples, the plurality of attributes including a first attribute unrelated to playback of the encoded video sample;
identifying a first subset of the first plurality of encoded video samples based on a first plurality of constraints, each of the first plurality of constraints corresponding to one of the plurality of attributes;
identifying a second subset of the first subset of the plurality of encoded video samples based on a second constraint, the second constraint corresponding to a combination of the attributes;
identifying one of the selected encoding profiles for each of the encoded video samples in the second subset, the identified selected encoding profiles corresponding to an encoding ladder; and
using the encoding ladder, encoding additional video samples in the set of media content not included among the first video samples.

2. The method as recited in claim 1, wherein the first attribute corresponds to an encoding runtime.

3. The method as recited in claim 1 wherein each of the plurality of first video samples corresponds to at least one of a video title, a video scene, a video fragment, a video frame, or a portion of a video frame.

4. The method as recited in claim 1, wherein each constraint in the first plurality of constraints corresponds to at least one of a delivery network limitation, a content playback limitation, or an encoding runtime limitation.

5. The method as recited in claim 1, wherein identifying the second subset further includes applying weights to the second constraint based on historical statistical characteristics of at least one of the plurality of attributes.

6. The method as recited in claim 1, wherein selecting the subset of the plurality of encoding profiles further comprises:
generating a second plurality of encoded video samples;
identifying a plurality of clusters in the first data space for the second plurality of encoded video samples;
determining that a first set of encoded video samples with encoding profiles having different values for only a first encoding parameter are within different clusters in the plurality of clusters;
assigning a high priority to the first encoding parameter;
determining that a second set of encoded video samples with encoding profiles having different values for only a second encoding parameter are within a first cluster in the plurality of clusters; and
assigning a low priority to the second encoding parameter.

7. The method of claim 6, wherein the first encoding parameter associated with the high priority corresponds to at least one of an adaptive-quantization mode, adaptive-quantization strength, constant rate factor, inter noise reduction level, or quantization group size.

8. The method as recited in claim 1, wherein identifying the second subset further comprises maximizing an area in the first data space based on the second constraint.

9. A system, comprising:
one or more processors and memory configured to:
select a subset of a plurality of encoding profiles, each encoding profile including a unique set of values for a set of encoding parameters, the selected encoding profiles representing optimal coverage of a first data space that encompasses all of the sets of values of encoding parameters represented by the plurality of encoding profiles;
encode each of a plurality of first video samples in a set of media content using each of the plurality of encoding profiles thereby generating a first plurality of encoded video samples;
determine values for a plurality of attributes for each of the first plurality of encoded video samples, the plurality of attributes including a first attribute unrelated to playback of the encoded video sample;
identify a first subset of the first plurality of encoded video samples based on a first plurality of constraints, each of the first plurality of constraints corresponding to one of the plurality of attributes;
identify a second subset of the first subset of the plurality of encoded video samples based on a second constraint, the second constraint corresponding to a combination of the attributes;
identify one of the selected encoding profiles for each of the encoded video samples in the second subset, the identified selected encoding profiles corresponding to an encoding ladder; and
using the encoding ladder, encode additional video samples in the set of media content not included among the first video samples.

10. The system as recited in claim 9, wherein the first attribute corresponds to an encoding runtime.

11. The system as recited in claim 9, wherein each of the plurality of first video samples corresponds to at least one of a video title, a video scene, a video fragment, a video frame, or a portion of a video frame.

12. The system as recited in claim 9, wherein each constraint in the first plurality of constraints corresponds to at least one of a delivery network limitation, a content playback limitation, or an encoding runtime limitation.

13. The system as recited in claim 9, wherein identifying the second subset further includes applying weights to the second constraint based on historical statistical characteristics of at least one of the plurality of attributes.

14. The system as recited in claim 9, wherein selecting the subset of the plurality of encoding profiles further comprises:
generating a second plurality of encoded video samples;
identifying a plurality of clusters in the first data space for the second plurality of encoded video samples;
determining that a first set of encoded video samples with encoding profiles having different values for only a first encoding parameter are within different clusters in the plurality of clusters;
assigning a high priority to the first encoding parameter;
determining that a second set of encoded video samples with encoding profiles having different values for only a second encoding parameter are within a first cluster in the plurality of clusters; and
assigning a low priority to the second encoding parameter.

15. The system of claim 14, wherein the first encoding parameter associated with the high priority corresponds to at least one of an adaptive-quantization mode, adaptive-quantization strength, constant rate factor, inter noise reduction level, or quantization group size.

16. The system as recited in claim 9, wherein identifying the second subset further comprises maximizing an area in the first data space based on the second constraint.

17. A computer program product, comprising one or more non-transitory computer-readable media having computer program instructions stored therein, the computer program instructions being configured such that, when executed by one or more computing devices, the computer program instructions cause the one or more computing device to:

select a subset of a plurality of encoding profiles, each encoding profile including a unique set of values for a set of encoding parameters, the selected encoding profiles representing optimal coverage of a first data space that encompasses all of the sets of values of encoding parameters represented by the plurality of encoding profiles;

encode each of a plurality of first video samples in a set of media content using each of the plurality of encoding profiles thereby generating a first plurality of encoded video samples;

determine values for a plurality of attributes for each of the first plurality of encoded video samples, the plurality of attributes including a first attribute unrelated to playback of the encoded video sample;

identify a first subset of the first plurality of encoded video samples based on a first plurality of constraints, each of the first plurality of constraints corresponding to one of the plurality of attributes;

identify a second subset of the first subset of the plurality of encoded video samples based on a second constraint, the second constraint corresponding to a combination of the attributes;

identify one of the selected encoding profiles for each of the encoded video samples in the second subset, the identified selected encoding profiles corresponding to an encoding ladder; and using the encoding ladder, encode additional video samples in the set of media content not included among the first video samples.

18. The system as recited in claim 17, wherein each constraint in the first plurality of constraints corresponds to at least one of a delivery network limitation, a content playback limitation, or an encoding runtime limitation.

19. The system as recited in claim 17, wherein selecting the subset of the plurality of encoding profiles further comprises:

generating a second plurality of encoded video samples;

identifying a plurality of clusters in the first data space for the second plurality of encoded video samples;

determining that a first set of encoded video samples with encoding profiles having different values for only a first encoding parameter are within different clusters in the plurality of clusters;

assigning a high priority to the first encoding parameter;

determining that a second set of encoded video samples with encoding profiles having different values for only a second encoding parameter are within a first cluster in the plurality of clusters; and assigning a low priority to the second encoding parameter.

20. The system as recited in claim 17, wherein identifying the second subset further comprises maximizing an area in the first data space based on the second constraint.

* * * * *